United States Patent [19]

Spofford et al.

[11] Patent Number: 5,320,307
[45] Date of Patent: Jun. 14, 1994

[54] AIRCRAFT ENGINE THRUST MOUNT

[75] Inventors: Hahn M. Spofford, West Chester, Ohio; Thomas G. Wakeman, Lawrenceburg, Ind.; Donald L. Bellia; Thomas P. Joseph, both of West Chester, Ohio; Gregg H. Wilson, Cincinnati, Ohio; James E. Cencula, Middletown, Ohio; Frederick W. Tegarden, Glendale, Ohio; Michael H. Schneider, Loveland, Ohio

[73] Assignee: General Electric Company, Cincinnati, Ohio

[21] Appl. No.: 857,136

[22] Filed: Mar. 25, 1992

[51] Int. Cl.$^5$ .............................................. F02C 7/20
[52] U.S. Cl. ..................................... 244/54; 60/39.31; 248/554
[58] Field of Search .................. 244/54, 55; 60/39.31; 248/554, 555

[56] References Cited

U.S. PATENT DOCUMENTS

| | | | |
|---|---|---|---|
| 3,675,418 | 7/1972 | Lenkeit et al. | 244/54 |
| 3,750,983 | 8/1973 | Morris | 244/54 |
| 3,844,115 | 10/1974 | Freid | 244/54 |
| 4,266,741 | 5/1981 | Murphy | 244/54 |
| 4,326,682 | 4/1982 | Nightingale | 248/554 |
| 4,452,038 | 6/1984 | Soligny | 60/39.31 |
| 4,603,821 | 8/1986 | White | 244/54 |
| 4,603,822 | 8/1986 | Chee | 244/54 |
| 4,717,094 | 1/1988 | Chee | 244/54 |
| 4,725,019 | 2/1988 | White | 244/54 |

OTHER PUBLICATIONS

M. H. Schneider, GE Aircraft Engines, GE90 "Nacelle Structures" May 9–11 1990. GE Airline Review Team. GE Airline Review Team, "Aft Mount" May 9–11, 1990.
Nacelle Structures–Additional pages from May 9–11, 1990 GE90 Airline Review Team Meeting Presentation page entitled "GE90 Integrated Propulsion System" and page entitled GE90 Propulsion System Integrated Nacelle Structural Components Major Materials from Jan. 17, 1990 GE90 Propulsion System Status for United Airlines presentation.
General Electric Company, CF6-80C2 aft engine mount drawing, in production for more than one year, single drawing sheet, FIG. 2.3.
Boeing, "777 Propulsion Design Review GE90 Strut Structure and Fairings," Feb. '91, five pages.

Primary Examiner—Joseph F. Peters, Jr.
Assistant Examiner—Virna Lissi Ansley
Attorney, Agent, or Firm—Jerome C. Squillaro

[57] ABSTRACT

An aircraft engine thrust mount includes a pair of spaced apart thrust links pivotally joined at one end to an engine first frame and at opposite ends to a lever. A platform is fixedly joined to an aircraft pylon and includes first and second spaced apart clevises and a center clevis therebetween. The center clevis is pivotally joined to a center of the lever for carrying thrust force from the first frame through both thrust links and to the platform and pylon during normal operation. A pair of pins pivotally join the thrust links to the lever and extend through apertures in the platform first and second clevises to define predetermined gaps therebetween for allowing the lever to rotate relative to the platform center clevis up to a predetermined angular rotation. In a failure mode of operation the pins contact the platform first and second clevises for transmitting thereto either tension or compression thrust loads for providing an alternate failsafe loadpath. In a preferred embodiment, the platform further includes an aft mount joined to an engine second frame spaced aft of the engine first frame.

10 Claims, 5 Drawing Sheets

AIRCRAFT ENGINE THRUST MOUNT

TECHNICAL FIELD

The present invention relates generally to aircraft mounted gas turbine engines, and, more specifically, to a mount for supporting an engine to a wing or tail pylon.

BACKGROUND ART

A gas turbine engine is typically mounted below an aircraft wing or within an aircraft tail section by a pylon. The engine is typically mounted at its forward end, an intermediate section, and its aft end for transmitting loads to the pylon. The loads typically include vertical loads such as the weight of the engine itself, axial loads due to the thrust generated by the engine, side loads such those due to wind buffeting, and roll loads or torques due to rotary operation of the engine. The mounts must also accommodate both axial and radial thermal expansion and contraction of the engine relative to the supporting pylon.

Both the forward and aft mounts are typically provided for carrying in-plane loads to the pylon, which in-plane loads are those occurring in a single axial plane extending perpendicularly outwardly from the longitudinal axis of the engine and include vertical and horizontal loads and rotary torque or moments. The thrust mount is provided for transferring the axially directed thrust loads from the engine to the pylon which are tension loads during forward propulsion of the aircraft, and compression loads which occur during the use of the engine's thrust reverser during braking of the aircraft upon landing.

An exemplary conventional thrust mount includes a pair of circumferentially spaced apart elongate thrust links pivotally joined at forward ends thereof to a conventional fan frame, and at opposite, aft ends thereof are pivotally joined to a lever sometimes referred to as a whiffle tree. The two thrust links are pivotally joined to opposite ends of the lever, and the center of the lever is pivotally joined to a platform fixedly joined to the pylon. The several thrust link pivotal joints include conventionally known spherical bearings, also known as uniballs, which allow slight rotation of the thrust links in three orthogonal planes relative to the fan frame and the lever. And, the lever center joint includes a pin through a bushing for single plane rotation.

During forward propulsion of the aircraft, forward axial thrust is carried through the thrust links, which undergo tension, and in turn through the center of the lever to the platform and pylon. The lever provides for a slight rotation about its center to equilize axial load between the two thrust links. When the thrust reverser is deployed, an aft directed thrust force is carried through the thrust links, which undergo compression, and in turn through the center of the lever and the platform to the pylon.

The thrust mount requires failsafe operation in the event of failure of any of its components to provide an alternate loadpath between the fan frame and the pylon to ensure that the thrust loads may be suitably carried. In one exemplary design, the lever includes two aft failsafe extensions at the respective ends of the lever which are positioned in respective failsafe clevises extending forwardly from the platform. Conventional failsafe shear bolts or pins extend through these failsafe clevises and through an enlarged aperture in the lever failsafe extensions. The extension apertures are predeterminedly larger in diameter than the outer diameter of the failsafe pins to provide clearance gaps so that the lever may rotate about its center up to a predetermined angular rotation for allowing normal deviations of the lever during normal expected operation of the engine in the aircraft. However, in the event of a failure of a thrust link, or lever, or one of their pivotal joints, which failure causes the failsafe extension to contact the failsafe pin during operation, thrust loads will then be carried therethrough and through the failsafe clevises to the platform and in turn to the pylon for providing the alternate loadpath.

For example, the joint at the center of the lever may develop a crack which severs the lever in half separating it completely from the platform. In such a failure, the thrust loads will be carried through the alternate paths from the thrust links through the lever ends and in turn through the lever failsafe extensions, failsafe pins, and platform failsafe clevises to the platform and to the pylon.

It is desirable to provide a loadpath from the fan frame to the pylon which is as straight as possible and aligned coaxially with the centerline axis of each thrust link to prevent undesirable bending loads and stresses which would require a larger and heavier thrust mount. However, in a failure of one thrust link loadpath not involving the lever center joint, axial thrust loads will be transmitted through the other thrust link and through both the center of the lever to the platform and the lever failsafe extension to the platform. Therefore, a compromise must be made in the configuration of the respective loadpaths since such loadpaths are necessarily different from each other, and transmitting tension or compression loads without bending in the loadpath is not possible under all circumstances.

Furthermore, since the several joints between the thrust links, lever, lever failsafe extensions and their clevises necessarily have clearances and slight rotational capability in various planes due to the spherical bearings and gaps utilized, unstable operation of the assembly may occur during reverse thrust operation in a failure event. For example, if the lever were to be separated in half through its center joint as above described, each side of the lever would operate independently of the other side in a three-hinged chain of the thrust link joined to the fan frame and lever at first and second hinges, and the lever failsafe extension joined to the platform failsafe clevis at a third hinge. Under tension through the thrust link in forward propulsion of the aircraft, the respective three-hinged loadpath through the thrust links would merely elongate slightly as in a chain in tension but nevertheless with the ability for restraining tension loads being substantially unimpaired. However, if compressive thrust loads are carried by the thrust links during reverse thrust operation in such a failure, the two joints or hinges created between the thrust link and the lever end and the lever failsafe extension and the platform failsafe clevis will allow rotation in one or more planes. This leads to misalignment of the components and the inability to transmit compressive thrust loads which is like attempting to transmit compressive loads through the chain in the above analogy.

Accordingly, in view of this potential instability in a failure under a reverse thrust condition, the lever is required to be designed as a monolithic or non-failsafe item which increases its strength and correspondingly the size and weight of the thrust mount. However, the space available for the entire thrust mount and requirements for maximum weight of the thrust mount for a particular design place limits on the design of the thrust mount. In one present application, the use of such a conventional thrust mount is not desirable because space and weight limitations would be exceeded for a given maximum thrust capability requirement.

OBJECTS OF THE INVENTION

Accordingly, one object of the present invention is to provide a new and improved aircraft engine thrust mount.

Another object of the present invention is to provide an improved thrust mount which is effective for carrying axial thrust loads in both tension and compression during a failure condition of the thrust mount.

Another object of the present invention is to provide an improved thrust mount effective for carrying thrust loads with reduced bending loads therefrom.

Another object of the present invention is to provide an improved thrust mount having reduced weight and increased structural efficiency in a compact configuration while maintaining failsafe capability.

DISCLOSURE OF INVENTION

An aircraft engine thrust mount includes a pair of spaced apart thrust links pivotally joined at one end to an engine first frame and at opposite ends to a lever. A platform is fixedly joined to an aircraft pylon and includes first and second spaced apart clevises and a center clevis therebetween. The center clevis is pivotally joined to a center of the lever for carrying thrust force from the first frame through both thrust links and to the platform and pylon during normal operation. A pair of pins pivotally join the thrust links to the lever and extend through apertures in the platform first and second clevises to define predetermined gaps therebetween for allowing the lever to rotate relative to the platform center clevis up to a predetermined angular rotation. In a failure mode of operation the pins contact the platform first and second clevises for transmitting thereto either tension or compression thrust loads for providing an alternate failsafe loadpath. In a preferred embodiment, the platform further includes an aft mount joined to an engine second frame spaced aft of the engine first frame.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

BEST MODE FOR CARRYING OUT THE INVENTION

Figure 1:
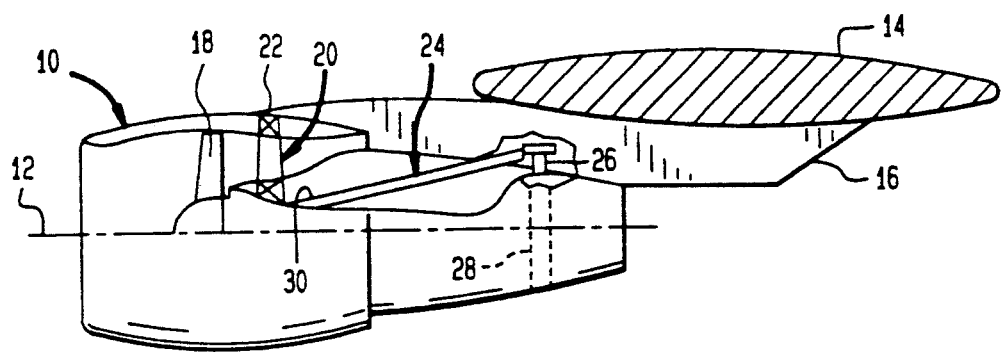
FIG. 1 is a schematic representation of an exemplary turbofan gas turbine engine mounted to a pylon of an aircraft wing by a thrust mount in accordance with one embodiment of the present invention.

Illustrated schematically in FIG. 1 is an exemplary turbofan gas turbine engine 10 having a longitudinal centerline axis 12 which is mounted to a conventional wing 14 of an aircraft by a conventional pylon 16. More specifically, the engine 10 includes a conventional fan 18 which is supported by conventional annular fan, or first, frame 20 conventionally fixedly joined in the engine 10. A conventional forward mount 22 fixedly joins the fan frame 20 to the pylon 16. A thrust mount 24 in accordance with a preferred embodiment of the present invention extends between the hub of the fan frame 20 and the pylon 16 for carrying thrust force generated by the engine 10 to the pylon 16. In a further modification as described below the thrust mount 24 preferably also includes an aft mount 26 in combination therewith, which aft mount 26 supports a conventional second, or turbine rear frame 28 fixedly joined in the engine 10. The fan frame 20 and the turbine rear frame 28 are disposed coaxially about the centerline axis 12.

Figure 2:
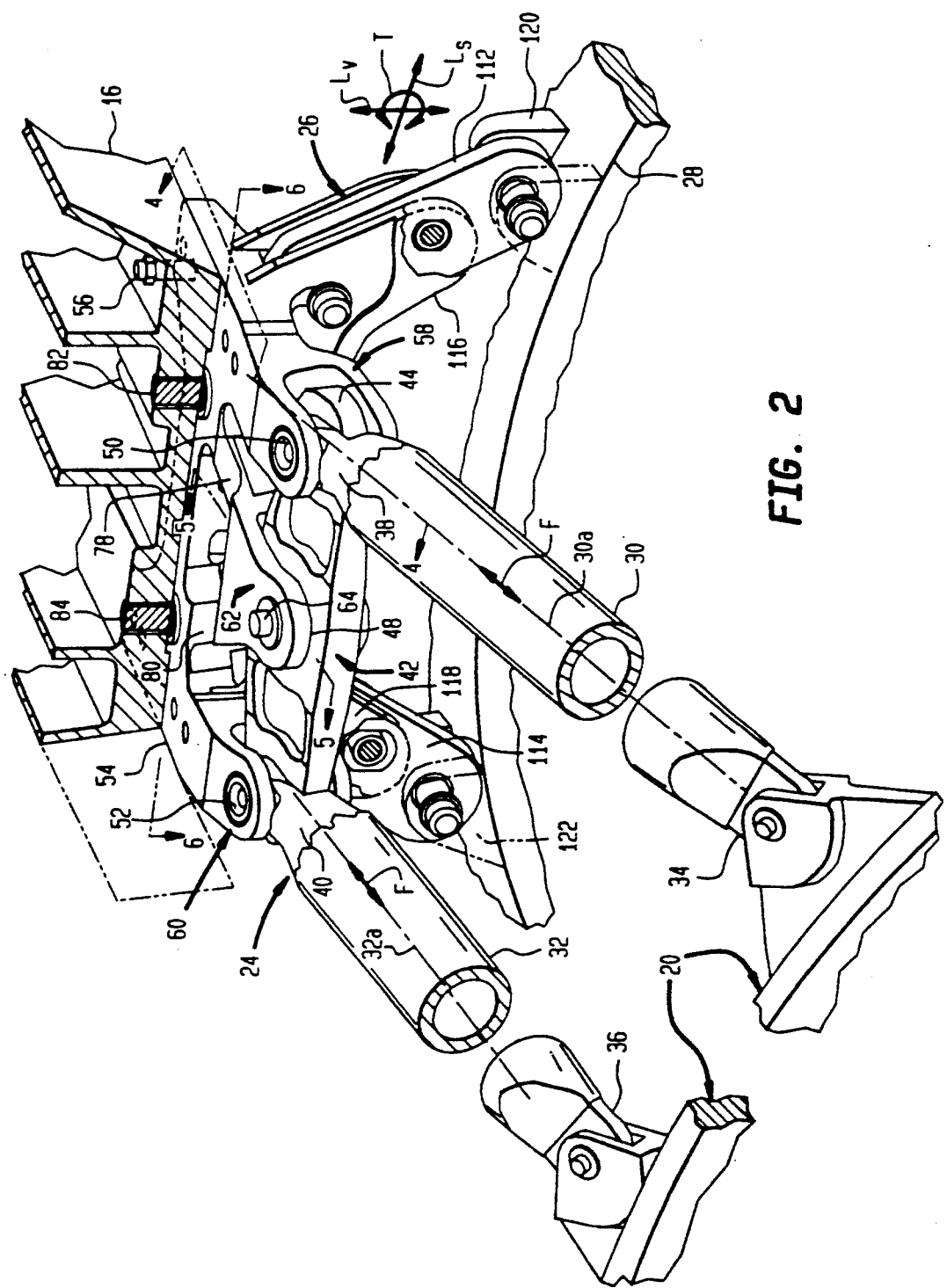
FIG. 2 is a schematic, perspective aft and side facing view of the thrust mount illustrated in FIG. 1.
Figure 3:
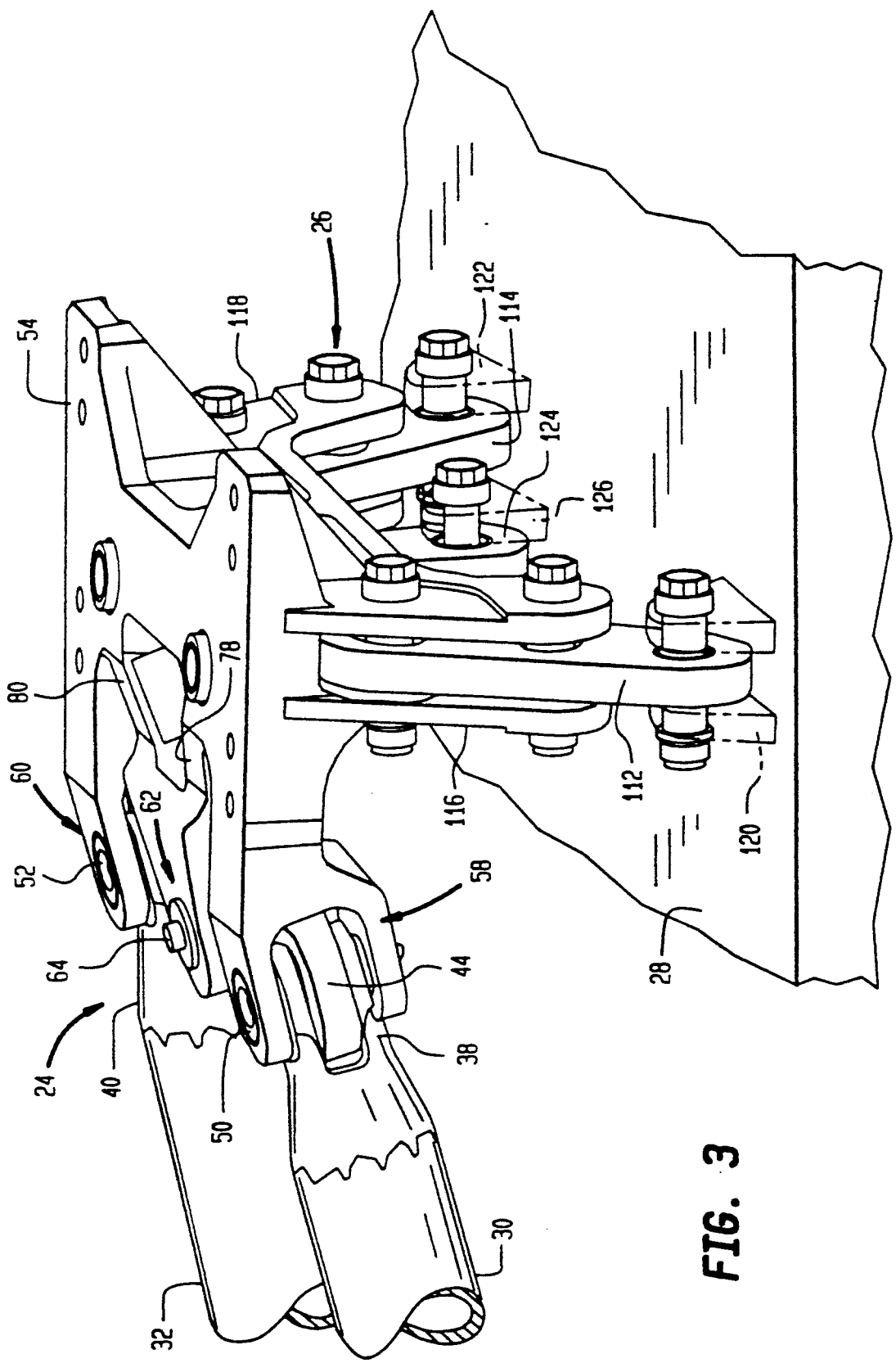
FIG. 3 is a forward and side facing perspective view of the thrust mount illustrated in FIG. 2.

The thrust mount 24 is illustrated in more particularity in FIGS. 2 and 3, and in this exemplary embodiment includes in combination therewith the aft mount 26, although in alternate embodiments the aft mount 26 may be separate from the thrust mount 24. The thrust mount 24 includes the fan frame 20, only a portion of the hub thereof being shown in FIG. 2, from which extends first and second, circumferentially spaced apart, elongate thrust links or tubes 30 and 32. Each thrust link 30, 32 includes a forward or distal end 34, 36 conventionally pivotally joined to the fan frame 20, an opposite, aft or proximal end 38, 40, and a longitudinal centerline axis 30a, 32a extending therebetween, respectively. An evener beam or lever, also referred to as a whiffle tree, 42 includes first and second laterally or circumferentially spaced apart opposite ends 44, 46 and a center 48 therebetween. The lever first and second ends 44, 46 are pivotally joined to the first and second thrust link proximal ends 38, 40, respectively by first and second lever or shear pins 50, 52, respectively.

A supporting or mounting platform 54 is fixedly joined to the pylon 16 by conventional mounting bolts 56 extending through complementary holes in the platform 54 and secured by conventional nuts, with eight bolts 56 being used in this exemplary embodiment which extend through the eight holes illustrated.

Figure 5:
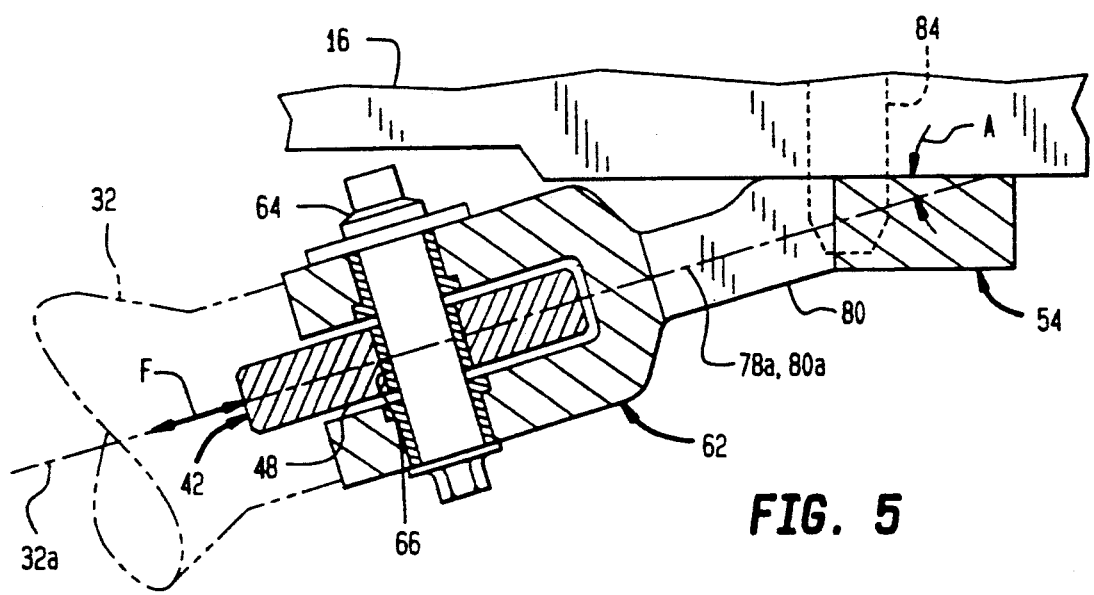
FIG. 5 is an axial, partly sectional view of a portion of the thrust mount illustrated in FIG. 2 taken along line 5—5.

The platform 54 includes first and second laterally or circumferentially spaced apart failsafe clevises 58, 60, and a center clevis 62 disposed equidistantly therebetween. The lever center 48 is conventionally pivotally joined inside the U-shaped slot between the two legs of the platform center clevis 62 as illustrated in more particularity in FIG. 5 for carrying thrust load or force F from the fan frame 20 through both the first and second thrust links 30, 32, and to the platform 54 and the pylon 16 during normal operation as shown in FIGS. 2 and 5. The thrust force F is designated with a double headed arrow since the force may either be forwardly directed during propulsion operation of the engine 10 which places the thrust links 30, 32 in tension, or may be in an aft direction upon deployment of the conventional thrust reverser of the engine 10 which places the thrust links 30, 32 in compression.

During normal operation, the thrust forces F through both links 30, 32 are generally equal and are carried equally through the first and second lever pins 50, 52 into the lever 42. A conventional center bolt or pin 64 is illustrated more particularly in FIG. 5 and extends through the center clevis 62 and through a conventional bushing 66 extending through the lever center 48 for joining the lever 42 to the center clevis 62. During normal operation, the axial thrust force F from both thrust links 30, 32 is carried through the lever 42 and in turn solely through the center bolt 64 to the center clevis 62 of the platform 54 and then to the pylon 16. Referring again to FIG. 2, the lever 42 is thusly allowed to rotate as required about the center bolt 64 relative to the center clevis 62 during normal operation for conventionally balancing the thrust forces F between the first and second links 30, 32.

As described above in the Background Art section, in order to provide a conventional failsafe or additional loadpath from the thrust links 30, 32 to the pylon 16, lever failsafe extensions (not shown) would extend rearwardly from the lever 42 at both ends of the lever 42 and be received in complementary clevises (not shown) extending from the platform 54. However, such an arrangement as described above is relatively large and heavy for accommodating the expected thrust loads during failure conditions since the lever 42 must be treated as a non-failsafe element as above described. In accordance with the present invention, the problems addressed above are eliminated or ameliorated by providing the first and second platform or failsafe clevises 58, 60 directly joined to both the first thrust link proximal end 38 and the lever first end 44, and the second thrust link proximal end 40 and the lever second end 46, respectively.

Figure 4:
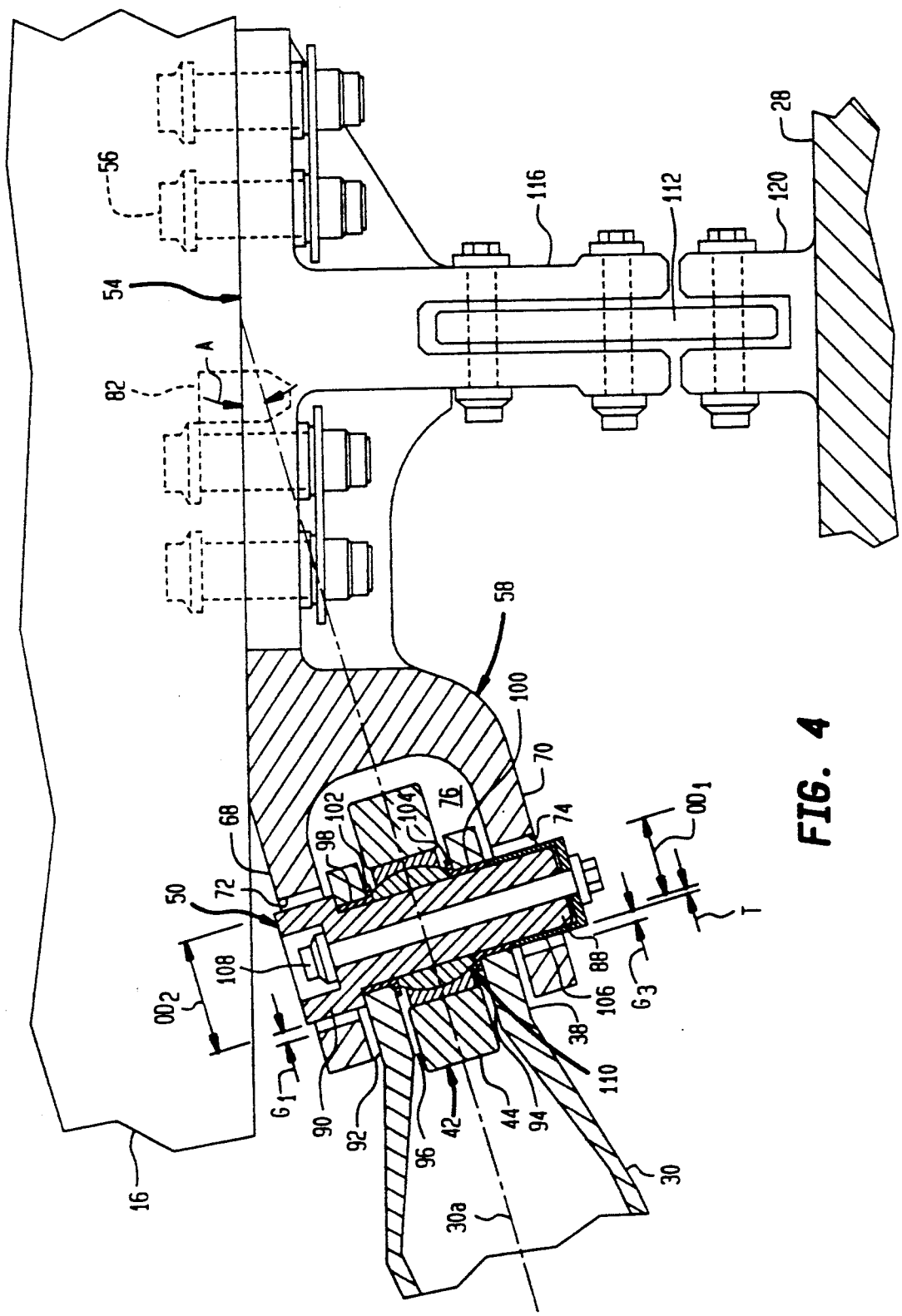
FIG. 4 is an axial, partly sectional view of a portion of the thrust mount illustrated in FIG. 2 taken along line 4—4.

The first and second platform clevises 58 and 60 are preferably identical to each other and are stacked over the respective lever ends 44, 46 and thrust link ends 38 and 40 coaxially about the respective pins 50, 52. The details of the joint at the first platform clevis 58 are described hereinbelow, with it being understood that the joint for the second platform clevis 60 is identical. Referring to FIG. 4, each of the first and second platform clevises 58, 60 includes first and second spaced apart legs 68, 70, each of the legs 68, 70 having an aperture 72, 74 which are both coaxially aligned along the centerline axis of the respective pins 50, 52. The first and second legs 68, 70 are also referred to as top and bottom legs 68, 70 which are spaced generally radially apart relative to/to the center line axis 12 define therebetween an inclined U-shaped clevis slot 76, with the top leg 68 being at a higher tangent plane than the bottom leg 70.

Figure 6:
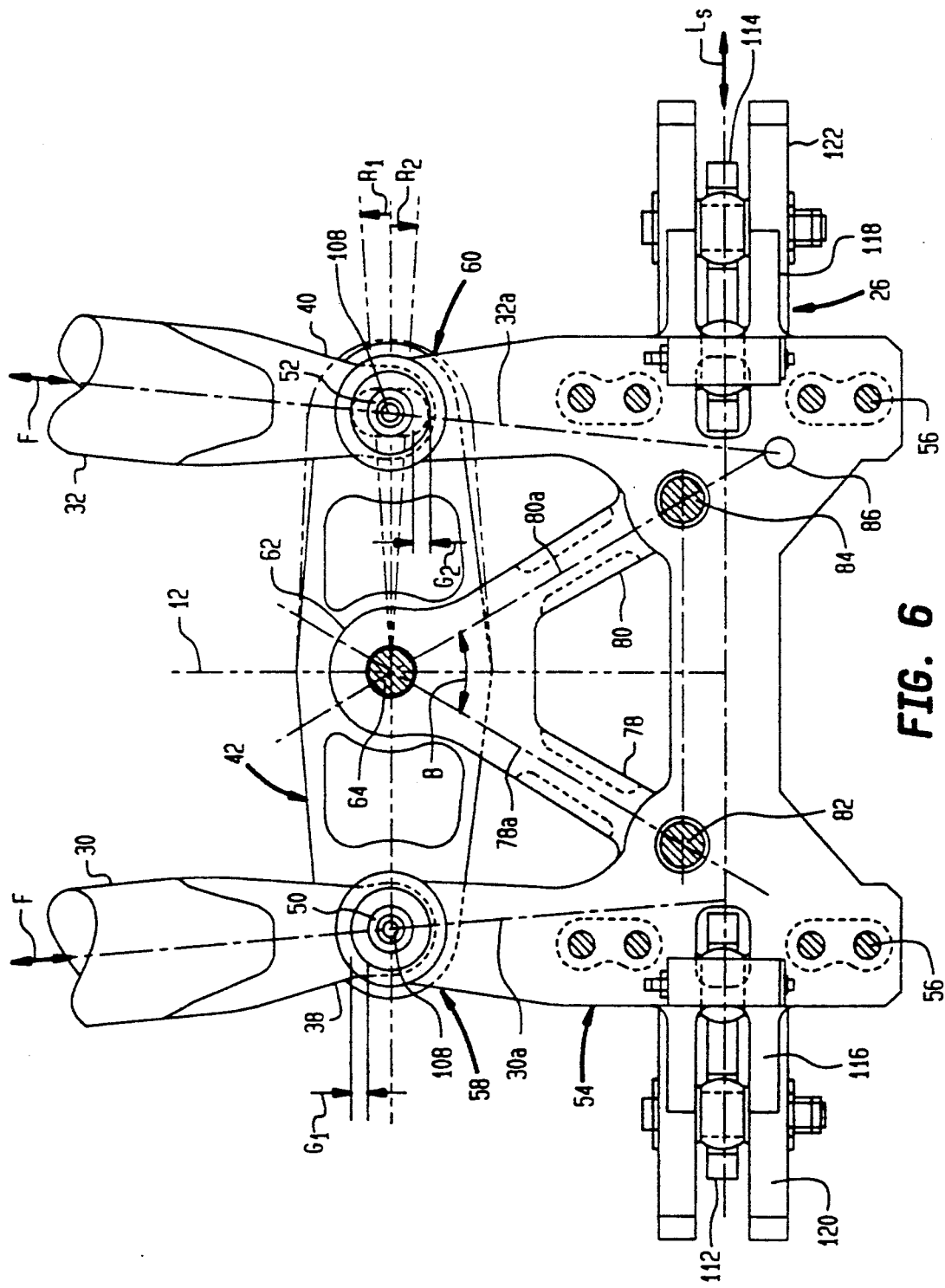
FIG. 6 is a radially inwardly facing view of a portion of the thrust mount illustrated in FIG. 2 taken generally along line 6—6.

As shown in FIG. 4, the first thrust link proximal end 38 and the lever first end 44 are disposed or captured in the slot 76 of the first clevis 58, with the first pin 50 being disposed coaxially through the top and bottom apertures 72, 74 to define therebetween a predetermined first annular gap $G_1$ for allowing the lever 42 to pivot or rotate relative to the platform center clevis 62 and lever center 48 around the center bolt 64, as shown in FIG. 6, up to a predetermined angular rotation $R_1$ in the counterclockwise direction, and $R_2$ in the clockwise direction as shown in phantom. Similarly, the second thrust link proximal end 40 and the lever second end 46 are disposed or captured within the respective clevis slot of the platform second clevis 60 as shown in FIGS. 2 and 6, with the second lever pin 52 being disposed coaxially through the top and bottom leg apertures of the second clevis 60 and defining therebetween a predetermined second annular gap $G_2$ which is preferably equal to the first gap $G_1$ for allowing the lever 42 to pivot relative to the center bolt 64 up to the predetermined angular rotations $R_1$, $R_2$.

By this arrangement, the thrust links 30, 32 and the lever 42 joined thereto perform in the same manner as a conventional assembly of two thrust links and lever during normal operation, but with the thrust forces F being transferred to the platform center clevis 62 and in turn to the pylon 16 in an improved manner as described below for failsafe operation during a failure event. By stacking the platform first and second clevises 58 and 60 directly over the respective first and second pins 50, 52, an improved failsafe combination results.

For example, and referring to FIG. 2, in the event of a failure in which a crack propagates transversely across the lever 42 in the axial direction severing it in half spanwise at the center bolt 64, each half of the lever 42 will, therefore, be unsupported at the center clevis 62 but an additional or failsafe loadpath will be provided by the stacked first and second clevises 58, 60 over the respective pins 50, 52. When the thrust force F is directed forward and places the links 30, 32 in tension, the two pins 50, 52 will be caused to move forward closing their respective gaps $G_1$, $G_2$ and contacting forward ends of their respective apertures, i.e. 72, 74, thusly transferring the thrust force F directly into both clevises 58, 60. Similarly, when the thrust force F is directed aft and places the links 30, 32 in compression, the respective pins 50, 52 are driven in an aft direction closing the gaps $G_1$, $G_2$ and contacting the aft ends of the respective apertures, i.e. 72 and 74, for directly transferring the thrust force F into the respective clevises 58, 60. The resulting failsafe, or alternate loadpaths through the clevises 58, 60 provide a more direct loadpath to the platform 54 than in the conventional arrangement utilizing an additional clevis joint spaced aft of the link proximal ends 38, 40 as described above in the Background Art section. The eliminated joint therefore eliminates the instability problem in compression as described above, and, furthermore, now excludes the lever 42 from the failsafe load path instead of being designed as a non-failsafe or monolithic item. The lever 42 may, therefore, now be designed for a less stringent life goal which makes it lighter in weight, which is a significant advantage, with the alternate, failsafe loadpath being provided directly from the pins 50, 52 to their respective, stacked clevises 58, 60.

In order to further improve the structural efficiency for carrying the thrust force F from the links 30, 32 to the platform 54, it is preferred that the platform center clevis 62 as illustrated in FIG. 6 is joined to the platform 54 by first and second, circumferentially spaced apart beams 78, 80 which preferably diverge away from the center bolt 64 in the aft direction at an acute included angle B therebetween for carrying the thrust force F from, in turn, the first and second links 30, 32, the lever 42, the center pin 64, through the platform center clevis 62, and through both the first and second beams 78 and 80 to the platform 54. As shown in FIG. 6, each of the beams 78, 80 has a longitudinal centerline axis 78a, 80a which intersect at the center of the center bolt 64 in the center clevis 62 and diverge apart at the included angle B so that the beams 78, 80 form a triangle with the platform 54 with an opening through the middle thereof for reducing weight of the platform 54 while still providing a structurally efficient loadpath from the center clevis 62 to the platform 54.

In order to carry the thrust force F from the platform 54 to the pylon 16 as shown in FIGS. 2 and 6, first and second laterally spaced apart platform shear pins 82, 84 extend between the platform 54 and the pylon 16 in complementary apertures therein for directly carrying the thrust force F from the aft ends of the beams 78, 80 more directly to the pylon 16. As shown in FIG. 6, the beams 78, 80 are symmetrically circumferentially disposed relative to the engine centerline axis 12, and relative to the thrust links 30, 32, and the shear pins 82, 84 are circumferentially spaced apart from each other in a common axial plane and colinearly aligned with the respective beam centerline axes 78a, 80a, respectively, in the horizontal or circumferential plane illustrated. In this way, the thrust force F carried through the center clevis 62 during normal operation is transmitted in a straight line along the respective beams 78, 80 directly to the respective shear pins 82, 84 aligned directly therewith without generating additional bending loads which would otherwise occur if the pins 82, 84 were not colinearly aligned with the respective beam 78, 80, but were offset therefrom.

Also in the preferred embodiment, the thrust link centerline axes 30a, 32a have coaxial extensions in the aft direction from the pins 50, 52, and the respective shear pins 82, 84 are disposed adjacent thereto as closely as practical. More specifically, and for example, the second beam centerline axis 80a extends in an aft direction and intersects the second link centerline axis 32a also extending in an aft direction at a location labeled 86. In a preferred embodiment of the invention, the respective shear pins 82, 84 may be located at the respective intersection locations 86 so that the line of action of the thrust force F during normal operation and during failsafe operation directs the thrust force F in a straight line direction to the shear pins 82, 84 with reduced or no additional bending. As shown in FIG. 6, the thrust force F is transmitted to the shear pins 82, 84 solely along the beam centerline axes 78a, 80a during normal operation since the gaps $G_1$, $G_2$ prevent transmittal of the thrust force F directly from the pins 50, 52 to the platform clevises 58, 60. However, during a failsafe condition wherein either one of the pins 50, 52 closes its respective gap $G_1$, $G_2$ and contacts its respective clevis 58, 60, the thrust force F may then be carried coaxially along the respective link centerline axis 30a, 32a and through the respective platform clevis 58, 60 generally colinearly to the respective shear pin 82, 84. Due to space limitations in the particular design illustrated in FIG. 6, and the aft mount 26 combined therewith in the preferred embodiment, a compromise in the location of the shear pins 82, 84 relative to the link centerline axes 30a, 32a is made. The shear pins 82, 84 preferably remain respectively colinear with the beams 78, 80, but are positioned as close as possible adjacent to the extensions of link centerline axes 30a, 32a as space permits, and, if practical also colinearly therewith, as at location 86 for example.

As illustrated in FIG. 1, the thrust links 30, 32 are typically inclined radially outwardly in an aft direction from the hub of the fan frame 20 as is conventionally known. The acute inclination angle A of the link centerline axes 30a, 30b relative to the engine centerline axis 12 is illustrated in FIGS. 4 and 5. However, due to the stacked arrangement of the platform clevises 58, 60 over the respective pins 50, 52, a more efficient load carrying path results therefrom.

More specifically, the first and second platform clevises 58, 60 are inclined at the inclination angle A and are aligned coaxially with the first and second thrust links 30, 32 as shown, for example in FIG. 4. And, as shown in FIG. 5, the first and second beams centerline axes 78a, 80a are similarly inclined radially outwardly relative to the engine centerline axis 12 at the inclination angle A, with all three platform clevises 58, 60, and 62 being preferably identically inclined at the inclination angle A. The first and second thrust links centerline axes 30a, 32a are preferably directed toward the respective first and second platform shear pins 82, 84 generally colinearly therewith in the vertical plane illustrated in FIGS. 4 and 5 for providing a straight-line loadpath to the shear pins 82, 84 for eliminating or reducing bending stresses from the thrust force F.

Accordingly, the thrust links centerline axes 30a, 32a are preferably directed as close as practical toward the respective shear pins 82, 84 in both the horizontal, or circumferentially extending plane, illustrated in FIG. 6 as well as in the vertical plane illustrated in FIGS. 4 and 5 for more efficiently transmitting the thrust force F to the shear pins 82, 84. Furthermore, and as shown in FIGS. 2, 4, and 6, the shear pins 82, 84 are preferably disposed near the axial center of the platform 54 and axially between the pairs of mounting bolts 56 to further reduce extraneous bending loads from the thrust force F transmitted to the pylon 16. As shown more clearly in FIG. 6, the preferred alignment of the thrust links 30, 32, and the beams 78, 80 relative to the shear pins 82, 84 and the mounting bolts 56 provides a symmetrical arrangement with the thrust force F being directed toward the shear pins 82, 84 between the respective pairs of mounting bolts 56. This arrangement reduces or eliminates twisting of the platform 54 about the mounting bolts 56 and pins 82, 84 in the horizontal plane and, therefore, reduces loads on the mounting bolts 56 and the shear pins 82, 84.

The first and second lever pins 50, 52 may be configured in several alternate forms including conventional bolts and nuts for providing the respective gaps $G_1$, $G_2$ in the clevises 58, 60. In a preferred embodiment as illustrated in FIG. 4, each of the lever pins 50, 52 includes a tubular shank 88 having a first outer diameter $OD_1$ extending through respective ones of the first and second thrust link proximal ends 38, 40, the lever first and second ends 44, 46, and the bottom leg apertures 74 of the first and second platform clevises 58, 60. Each pin 50, 52 also includes an enlarged tubular head 90 having a second outer diameter $OD_2$ which is greater than the first outer diameter $OD_1$ and is fixedly joined with the shank 88 by being formed integrally therewith for example. The head 90 extends upwardly from the respective link proximal ends 38, 40 through the top leg aperture 72 of the respective platform clevises 58, 60.

In the preferred embodiment illustrated in FIG. 4, each of the first and second thrust link proximal ends 38, 40 is in the form of a clevis having top and bottom, generally radially spaced apart legs 92, 94 defining therebetween a slot 96 for respectively receiving the lever first and second ends 44, 46. Each of the legs 92, 94 includes top and bottom holes 98, 100 aligned coaxially about the respective pins 50, 52 for receiving therein the respective pins 50, 52.

An annular top bushing 102 is conventionally press fit into the top leg hole 98, with its radial flange facing downwardly toward the lever 42. An annular bottom bushing 104 is slidably disposed in the bottom leg hole 100, with its radial flange facing upwardly toward the lever 42. During assembly, the bushings 102, 104 are first inserted into their respective holes and then the lever 42 may be positioned therebetween inside the slot 96. The respective pins 50, 52 may then be inserted through the bushings 102, 104 so that the top bushing 102 is disposed around the upper end of the shank 88 and between the head 90 and the top of the lever 42, and the bottom bushing 104 is disposed around the lower end of the shank 88 and between the bottom end thereof and the lever 42. A cup-shaped capture bushing 106 is disposed around respective ones of the pin shanks 88, through the respective clevis bottom leg aperture 74, and against the bottom bushing 104.

Each of the pins 50, 52 includes a conventional tiebolt 108 extending therethrough for compressing together the head 90 and the capture bushing 106 so that the top and bottom bushings 102 and 104 are compressed against the lever 42, or more particularly against the edges of a conventional spherical bearing or uniball 110 conventionally disposed in the lever 42. The tie bolts 108 secure the pins 50, 52 to the link ends 38, 40 in position within the clevis apertures 72, 74, and provide a preload on the edges of the bearing 110 to prolong pin life. The bearing 110 includes a conventional outer race conventionally press fit into a complementary aperture in the lever 42 and a truncated spherical bearing element within the race which surrounds the pin shank 88. The bearing element is conventionally lubricated by a graphite compound or is suitably coated or lined with a conventional friction reducing material such as polytetrafluoroethylene for allowing rotation between the lever 42 and each of the thrust links 30, 32. The preferred stepped diameter pins 50, 52 improve clamping of the spherical bearing and the retention of the lever 42 in the respective link proximal ends 38, 40. The pin head 90 is pressed against the top leg 92 when the nut of the tiebolt 108 is tightened against the capture bushing 106 for clamping together the top and bottom bushings 102, 104 against the bearing element of the bearing 110.

The first and second pins 50, 52 are identically joined to the lever ends 44, 46 with respective spherical bearings 110. And, the link distal ends 34, 36 (FIG. 2) are identically pivotally joined to the fan frame 20 with similar spherical bearings 110 in a conventional manner.

The outer diameter $OD_2$ of the pin head 90 is suitably made smaller than the inner diameter of the clevis top leg aperture 72 for providing the respective gaps $G_1$, $G_2$ generally uniformly around the head 90. The shank diameter $OD_1$ and the thickness T of the capture bushing 106 are similarly selected to provide a diameter less than the inner diameter of the clevis bottom leg aperture 74 for providing an annular lower gap $G_3$ therebetween around each pin 50, 52 which is preferably identical to the respective gaps $G_1$, $G_2$. The gaps $G_1$, $G_2$, $G_3$ may, for example, be about 5 mm for providing a suitable clearance for normal operation of the thrust mount 24. The gaps G allow the lever 42 to rotate about the center bolt 64 up to the predetermined angular rotations $R_1$ and $R_2$ as shown in FIG. 6 during normal operation. In a failure event where the pins 50, 52 are allowed to close the gaps $G_1$, $G_2$, $G_3$ and contact the respective platform clevises 58, 60, the alternate failsafe loadpath is provided directly from the respective thrust link 30, 32 to the platform 54.

As illustrated in FIGS. 2, 3, 4, and 6, the thrust mount 24 preferably also includes the aft mount 26 sharing the common platform 54 for further improving structural efficiency, and maintainability with fewer mounting bolts and components required to be removed, thusly shortening maintenance time. Although the thrust links 30, 32 must be suitably extended in length to reach the turbine rear frame 28, a net reduction in weight of combining the aft mount 26 to the common platform 54 of the thrust mount 24 may result for a particular design by the elimination of the separate platform otherwise required for the aft mount 26. The aft mount 26 may be in any conventional form and preferably extends radially inwardly from the common platform 54 and aft of the lever 42. The aft mount 26 is conventionally joined to the turbine rear frame 28 for conventionally transferring in-plane loads therefrom to the pylon 16 through the platform 54. The in-plane loads are conventional and include radial or vertical loads $L_v$, side loads $L_s$ and moments or torques T about the engine centerline axis 12 as shown schematically in FIGS. 2 and 6.

As shown more clearly in FIG. 6, the aft mount 26 preferably extends circumferentially under the platform 54 and generally is colinearly aligned with the first and second platform shear pins 82, 84 in a common transverse or axial plane so that the side loads $L_s$ are transmitted to the platform 54 from the engine 10 in a direction parallel to and generally in line with both the first and second platform shear pins 82, 84. In this way, the shear pins 82, 84 may react both the thrust forces F from the fan frame 20 and the side loads $L_s$ from the rear frame 28 with reduced or eliminated twisting of the platform 54 in the horizontal plane. The vertical loads $L_v$ and the torque loads T are conventionally reacted by the several mounting bolts 56 extending through the platform 54 to the pylon 16.

The aft mount 26 may be conventionally configured, but in the preferred embodiment of the present invention as shown in FIGS. 2 and 3, for example, includes first and second active links 112, 114 conventionally pivotally joined at opposite ends thereof to respective outer clevises 116, 118 extending radially inwardly from the platform 54, and to respective inner clevises 120, 122 extending radially outwardly from the rear frame 28. Conventional spherical bearings (such as the spherical bearing 110 shown in FIG. 4) are used in the respective links 112, 114 for joining them to the respective clevises with conventional bolts therethrough. Both outer clevises 116, 118 extend radially inwardly to the middle of the respective links 112, 114 for securing bolts extending through the respective links 112, 114. The middle of the link 112 includes a race-track elongated aperture therein (FIG. 2) for receiving a conventional bushing around a conventional mounting bolt extending through the clevis 116 and through the middle of the first link 112. This allows for movement of the center bolt of the first link 112 in a single direction.

Correspondingly, the middle of the second link 114 also includes a race-track aperture (FIG. 2) receiving a slightly smaller bushing and bolt therethrough joining the middle of the second link 114 to the outer clevis 118. A predetermined gap is provided around the bushing for allowing both vertical and side movement of the middle of the second link 114 relative to the outer clevis 118.

In this way, both links 112, 114 are effective for together carrying the vertical loads $L_v$, the side loads $L_s$, and the torque T from the rear frame 28 to the platform 54 and in turn to the pylon 16 during normal operation. However, in failsafe operation upon failure of one of these components, either the first link 112 or the second link 114 will accommodate the side loads $L_s$ for providing one failsafe loadpath to the platform 54. And, a center lug 124 as shown in FIG. 3 extends radially inwardly from the platform 54 toward the rear frame 28 for providing another failsafe loadpath thereto, with both loadpaths collectively reacting both loads $L_v$ and $L_s$ and the torque T. The center lug 124 is received in a conventional center clevis 126 with a bolt extending therethrough, with the bolt having a smaller diameter than its corresponding aperture in the center lug 124 so that during normal operation no contact between the bolt and the center lug 124 occurs, with no transfer of loads therebetween. However, during a failure occurrence, the bolt of the center clevis 126 will contact the center lug 124 for providing an alternate loadpath.

The improved thrust mount 24 described above eliminates conventional additional joints between the lever 42 and the platform 54 for not only improving failsafe operation thereof, but providing a more structurally efficient assembly which may be configured in a more compact arrangement having reduced weight for transmitting a given thrust force as compared with a conventional design. In view of the stacked arrangement of the platform first and second clevises 58, 60 over the respective pins 50, 52, a more direct failsafe loadpath is provided between the thrust links 30, 32 and the platform 54 and eliminates the above described instability condition in thrust reverser operation. The lever 42 need no longer be designed as a monolithic element and may, therefore, be lighter in weight for improving the overall structural efficiency of the thrust mount 24. The use of the two spaced apart shear pins 82, 84 and the center clevis beams 78, 80 further reduces weight of the platform 54 while still providing a structurally efficient loadpath for the thrust force F. The preferred orientation of the beams 78, 80, and the thrust links 30, 32 relative to the shear pins 82, 84 and the mounting bolts 56 also further improves the structural efficiency of the thrust mount 24 for transferring the thrust force with reduced extraneous bending loads therefrom which further allows the thrust mount to be more efficiently designed with reduced weight for carrying a given thrust force F.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A thrust mount for supporting a gas turbine engine to a pylon of an aircraft comprising:
   an annular first frame in said engine disposed coaxially about a longitudinal centerline axis of said engine;
   first and second spaced apart thrust links, each having a distal end pivotally joined to said first frame, and each further including an opposite, proximal end;
   a lever including first and second ends and a center therebetween, said first and second ends being pivotally joined to said first and second thrust link proximal ends, respectively, by first and second lever pins, respectively;
   a platform fixedly joined to said pylon and including first and second spaced apart clevises and a center clevis therebetween;
   said lever center being pivotally joined to said platform center clevis for carrying thrust force from said first frame through both said first and second thrust links and said platform to said pylon;
   said platform first and second clevises each including top and bottom spaced apart legs defining therebetween a slot, and each of said top and bottom legs including coaxially aligned apertures;
   said first thrust link proximal end and said lever first end being disposed in said platform first clevis slot with said first pin being disposed through said first clevis top and bottom leg apertures and defining therebetween a predetermined first gap for allowing said lever to rotate relative to said platform center clevis up to a predetermined angular rotation; and
   said second thrust link proximal end and said lever second end being disposed in said platform second clevis slot with said second pin being disposed through said second clevis top and bottom leg apertures and defining therebetween a predetermined second gap for allowing said lever to rotate relative to said platform center clevis up to said predetermined angular rotation.

2. A mount according to claim 1 wherein said platform center clevis includes a center pin pivotally joining said platform center clevis to said lever center, and said platform center clevis is joined to said platform by first and second spaced apart beams diverging away from said center pin at an acute included angle therebetween for carrying said thrust force in turn from said first and second thrust links, said lever, and said center pin, and in turn through said platform center clevis and both said first and second beams to said platform.

3. A mount according to claim 2 further including first and second spaced apart platform shear pins extending between said platform and said pylon for carrying said thrust force from said first and second beams to said pylon.

4. A mount according to claim 3 wherein said first and second thrust links and said first and second beams each has a longitudinal centerline axis, and said first and second platform shear pins are aligned with said first and second beam centerline axes, respectively, and are disposed adjacent to extensions of said first and second thrust link centerline axes.

5. A mount according to claim 4 wherein:
   said first and second thrust links are aligned coaxially with said first and second platform clevises, respectively, along said respective first and second thrust link centerline axes;
   said first and second thrust link centerline axes and said first and second beam centerline axes are inclined radially outwardly relative to said engine centerline axis at an acute inclination angle; and
   said first and second thrust link centerline axes are directed toward said first and second platform shear pins, respectively.

6. A mount according to claim 1 wherein each of said first and second lever pins includes:

a tubular shank having a first outer diameter extending through a respective one of said first and second thrust link proximal ends, said lever first and second ends, and said first and second platform clevis bottom leg apertures; and a tubular head having a second outer diameter greater than said first outer diameter and fixedly joined with said shank, said tubular head extending through a respective one of said first and second platform clevis top leg apertures.

7. A mount according to claim 6 wherein said first and second thrust link proximal ends are each in the form of a clevis having top and bottom spaced apart legs defining therebetween a slot for respectively receiving said lever first and second ends, and each of said thrust link proximal end legs including coaxially aligned holes for receiving said respective first and second lever pins; and further including around each of said first and second lever pins:

an annular top bushing disposed in said top leg hole around a respective lever pin shank between said respective lever pin head and said lever;

an annular bottom bushing disposed in said bottom leg hole around said respective lever pin shank;

a capture bushing disposed around said lever pin shank and through said bottom leg hole, and against said bottom bushing; and a tiebolt extending through respective ones of said first and second lever pins for compressing together said lever pin head and said capture bushing so that said top and bottom bushings are compressed toward said lever for allowing rotation between said lever and said first and second thrust links.

8. A mount according to claim 7 wherein each of said lever first and second ends includes a respective spherical bearing, with a respective one of said lever pin shanks extending therethrough, and with said top and bottom bushings being compressed against opposite sides of said bearing.

9. A mount according to claim 1 further including:

an annular second frame in said engine spaced aft from said first frame; and an aft mount extending radially inwardly from said platform and aft of said lever, said aft mount being joined to said second frame for transferring in-plane loads therefrom to said pylon through said platform.

10. A mount according to claim 9 wherein said aft mount extends circumferentially under said platform and is aligned generally with said first and second platform shear pins so that side loads transmitted to said platform from said engine are directed generally in line with both said first and second platform shear pins.

* * * * *